(12) United States Patent
Yeary et al.

(10) Patent No.: US 8,979,068 B2
(45) Date of Patent: Mar. 17, 2015

(54) DIFFERENTIAL PRESSURE SEALING DEVICE FOR BALL VALVES

(75) Inventors: Arthur R. Yeary, Chicago, IL (US); James P. Azzinaro, Hoschton, GA (US); Hans D. Baumann, Rye, NH (US)

(73) Assignee: Yeary & Associates, Inc., Chicago, IL (US)

( * ) Notice: Subject to any disclaimer, the term of this patent is extended or adjusted under 35 U.S.C. 154(b) by 88 days.

(21) Appl. No.: 13/367,647

(22) Filed: Feb. 7, 2012

(65) Prior Publication Data

US 2012/0205569 A1 Aug. 16, 2012

Related U.S. Application Data

(60) Provisional application No. 61/441,796, filed on Feb. 11, 2011.

(51) Int. Cl.
*F16K 25/00* (2006.01)
*F16K 5/20* (2006.01)
*F16K 5/06* (2006.01)

(52) U.S. Cl.
CPC ............... *F16K 5/205* (2013.01); *F16K 5/0678* (2013.01)
USPC ............ 251/172; 251/175; 251/192; 251/314

(58) Field of Classification Search
CPC ....... F16K 5/205; F16K 5/227; F16K 5/0663; F16K 5/0678; F16K 5/0689; F16K 25/00
USPC ......... 251/158–161, 170–176, 192, 180, 185, 251/187, 315.01, 314; 137/246.12, 246.2, 137/246.21, 246.22
See application file for complete search history.

(56) References Cited

U.S. PATENT DOCUMENTS

| | | | | |
|---|---|---|---|---|
| 2,676,782 | A | * | 4/1954 | Bostock et al. .......... 137/516.29 |
| 3,095,004 | A | * | 6/1963 | Jackson, Jr. et al. ...... 137/246.11 |
| 3,256,182 | A | * | 6/1966 | Scherer .......................... 508/237 |
| 3,353,783 | A | * | 11/1967 | Bolling, Jr. ................... 251/172 |
| 3,497,177 | A | * | 2/1970 | Hulsey .......................... 251/172 |
| 3,930,636 | A | * | 1/1976 | Pugh ........................ 251/315.05 |
| 4,084,608 | A | * | 4/1978 | Laignel et al. ................. 137/316 |
| 4,137,936 | A | * | 2/1979 | Sekimoto et al. ......... 137/246.22 |
| 4,385,746 | A | * | 5/1983 | Tomlin et al. ................... 251/56 |
| 5,413,310 | A | | 5/1995 | Horvei |
| 2008/0107554 | A1 | * | 5/2008 | Shulver et al. .................. 418/26 |

* cited by examiner

*Primary Examiner* — Marina Tietjen
(74) *Attorney, Agent, or Firm* — Andrus Intellectual Property Law, LLP (57) ABSTRACT

A differential pressure sealing device for use with ball valves that utilizes the pressure of the fluid being communicated in a piping system to increase the sealing force created by the sealing device. Fluid being communicated through a ball valve is provided to a sealing device that includes some type of element for creating a bias force. The pressure of the fluid being communicated increases the sealing pressure created by the sealing device. In this manner, the bias force created in the sealing device benefits from the pressure of the fluid being communicated to enhance the sealing when used with a ball valve or similar component.

5 Claims, 7 Drawing Sheets

DIFFERENTIAL PRESSURE SEALING DEVICE FOR BALL VALVES

CROSS-REFERENCE TO RELATED APPLICATION

The present application is based on and claims priority to U.S. Provisional Patent Application Ser. No. 61/441,796, filed Feb. 11, 2011.

BACKGROUND

The present disclosure generally relates to a sealing device for use with ball valves. More specifically, the present disclosure relates to a differential pressure sealing device that utilizes the pressure created by the fluid passing through a piping system including a ball valve to pressurize a seating mechanism to aid in the operation of the ball valve.

Dirty, scaling fluids are fouling-up valves of all types in many industrial applications, including the refining, oil and gas production, geothermal power, chemical, pipeline and mining industries. The main weakness in most valves and in ball valves in particular, is that their seating designs do not keep particles and scale deposits out of the valve seat ring crevices, grooves, and cavities. This is particularly the case in trunnion style ball valves since their seat rings must be able to move axially to allow the line pressure to urge the seat onto the ball. When the seat ring cannot travel back and forth within the body end flange seat ring pocket, the seat cannot properly engage the ball seating surface and the valve cannot shut off, and/or the operating torques become excessive to the point of preventing the operation of the valve with resultant damage to the valve seats and its ball surface.

Trunnion ball valves, in particular, cannot be reliably used in many services such as with liquids and vapors that cause scale build-ups, and fluids that contain entrained minerals and solid materials such as sand, because such materials pack into the seat ring pocket spaces behind the seat rings of the valve and lock-it-up.

SUMMARY

The present disclosure generally relates to a sealing device for use with ball valves that utilizes the pressure created by the fluid passing through the ball valve to pressurize a sealing ring of a seating mechanism to aid in the operation of the ball valve.

The sealing system of the present disclosure is particularly desirable for use with trunnion ball valves and provides for excellent shutoff and ease of operation while at the same time eliminating the operational problems caused by sand, scale and debris. The sealing system of the present disclosure includes a two part metal seat ring cartridge that includes a chamber for energizing an axially-dynamic seat ring made by various materials, such as RTFE, peak, metals and ceramics, with a clean pressurizing fluid that is kept at a higher pressure than the pressure that the valve must seal against in the main pipe. Because the pressure behind the dynamic seat ring is higher than in the pipeline, the seating mechanism prevents the ingress of fluid from the main pipe into the seat ring energizing chamber, thus insuring the free axial movement of the seat ring against the sealing ball of the ball valve.

In one embodiment of the disclosure, the seating member charging chamber can be pressurized by utilizing a spring loaded differential piston device that communicates the pressure in the main pipe to a clean fluid, such as a non-compressible valve sealant. The additional differential force to pressurize the clean sealant insures that the sealing system will always exert a higher pressure on the inside of the seat ring than the pressure of fluid in the pipe which is against the face of the seat ring. The pressure differential across the seat ring provides the force advantage that seals off the valve. The pressure differential also functions to keep any of the fluid the valve is handling from carrying sand, scale or debris into the charging chamber.

In an alternate configuration, sealant is injected directly into the seating member charging chamber from a small sealant reservoir. The system maintains the sealant at a selected, constant pressure that is sufficiently higher than the pressure in the pipe to provide the force to seal off the valve and to prevent the ingress of any of the process fluid the valve is handling.

In yet another alternate configuration, the fluid coming from the pipe is filtered and used as the fluid to pressurize the seating member charging chamber. The charging chamber includes an additional spring to generate the pressure differential across the seat ring that is needed to provide shutoff and prevent the ingress of any fluid or contaminate into the chamber from the processed fluid the valve is handling.

In yet another alternate embodiment, the system utilizes a compatible fluid other than a sealant or the media the valve is handling to pressurize the seat ring. As an example, air, nitrogen, water or steam can be used to charge the seating member charging chamber and power the seat ring. In the case of steam, it will be possible to more efficiently heat a valve seat ring for use in viscous services.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
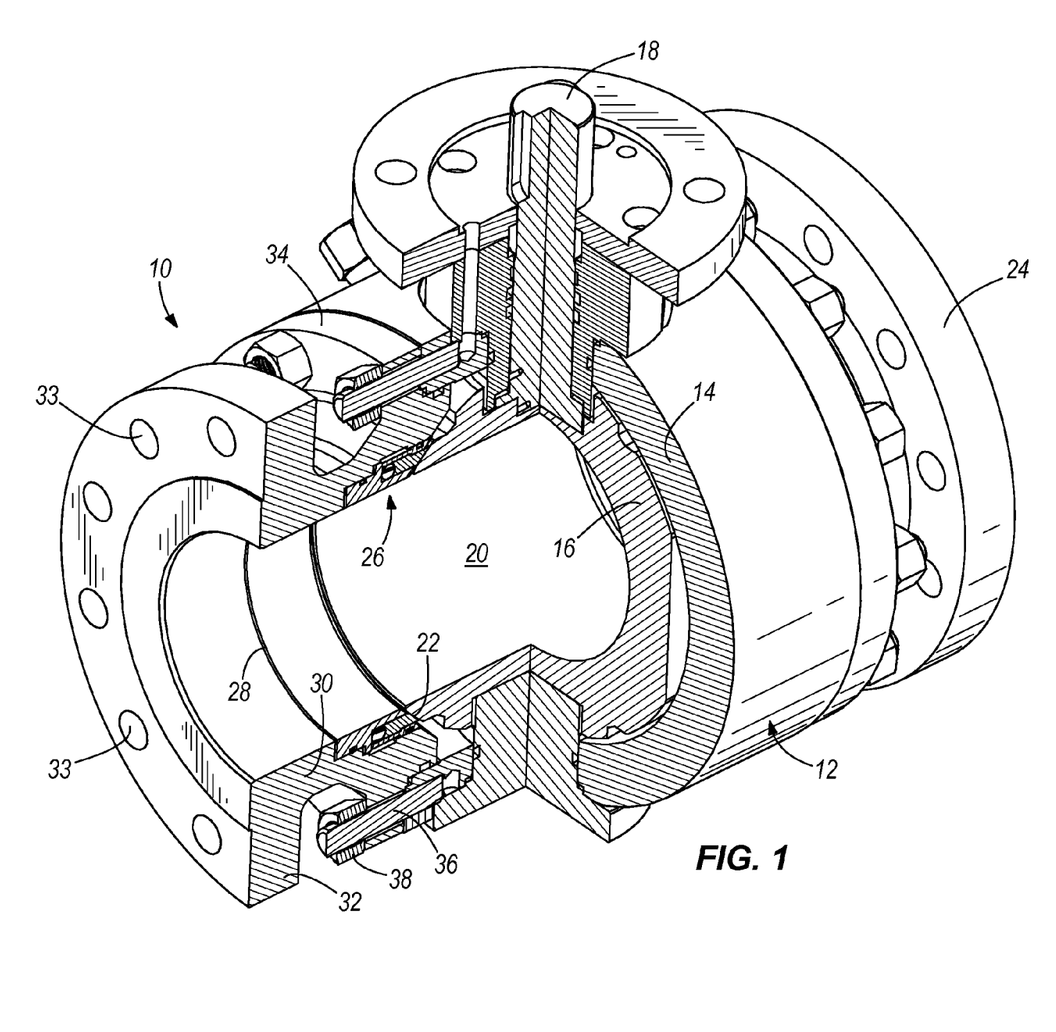
FIG. 1 is an isometric view illustrating the installation of the sealing system of the present disclosure on a conventional ball valve.

Referring first to FIG. 1, thereshown is a differential pressure sealing device 10 mounted in an operative position to a ball valve assembly 12. The ball valve assembly 12 includes an outer housing 14 that encloses a rotating ball 16 that is connected to a rotatable stem 18. The ball 16 includes an open flow passageway 20 that allows a fluid, which may be a liquid or gas, to selectively pass through the ball valve as the ball 16 is rotated in the housing 14. The ball 16 includes multiple seating surfaces 22. The ball 16 is rotatable within the outer housing 14 to selectively restrict fluid flow through a piping system 24.

Figure 2:
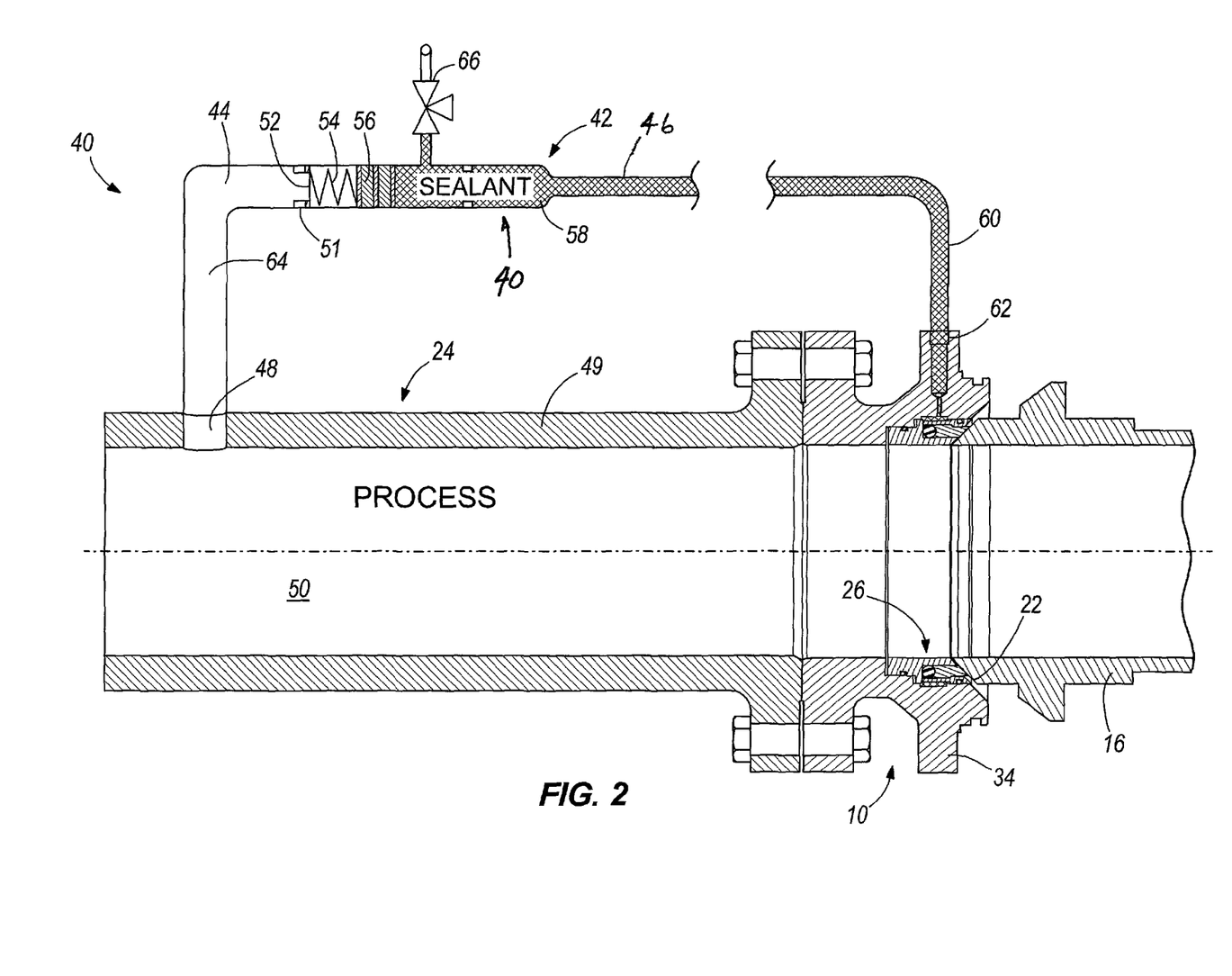
FIG. 2 is a schematic illustration of a first embodiment of a pressurizing system used to power the seating assembly.

The differential pressure sealing device 10 includes a sliding seating mechanism 26 that is mounted within an internal cavity or groove 28 formed in a metallic main body 30. The main body 30 includes an end flange 32 and an inner flange 34. The outer flange 32 includes multiple attachment holes 33 that allow the sealing device to be connected to a pipe of a piping system. The inner flange 34 allows the pressure sealing device 10 to be securely attached to the outer housing 14 of the ball valve 12 through a series of connectors 36 and attachment nuts 38. Thus, as can be seen in FIG. 1, the entire pressure sealing device 10 can be attached to a ball valve 12 to improve the sealing ability of the piping system FIG. 2 illustrates the installation of the pressure sealing device 10 within a piping system 24. As described previously, the pressure sealing device 10 includes the sliding seating mechanism 26 that creates a seal with a seating surface 22 formed on the ball 16 of a conventional ball valve. The pressure sealing device 10 forms part of a first embodiment of a sealing system 40 shown in FIG. 1. The sealing system 40 includes a pressurizing system 42 that supplies a pressurized fluid, such as a non-compressible valve sealant, to power the sliding seating mechanism 26. In the embodiment shown in FIG. 2, the pressurizing system 42 includes an inlet port 44 and an outlet port 46. The inlet port 44 is in pressure communication with a pressure sensing port 48 extending through an outer wall 49 of the piping system 24. The pressure sensing port 48 allows the inlet port 44 to draw a portion of the fluid flowing through the open interior 50 of the piping system 24 into the inlet port 44 through the inlet line 64. The fluid flowing in the piping system 24 is flowing at a first pressure. The fluid drawn from the piping system 24 and contained within the inlet port 44 contacts a movable pressure wall 52 that is in direct contact with a compressed charging spring 54. The charging spring 54 is pre-compressed by stationary pegs 51. The opposite end of the charging spring 54 contacts a moving piston 56 that has an opposite end in fluid communication with a supply a pressurizing fluid, such as a non-compressible sealant, shown in the reservoir 58. The charging spring 54 exerts a bias force on the piston 56 to preload and pre-pressurize the volume of the pressurizing fluid contained within the reservoir 58. In the embodiment illustrated, the pressurizing fluid contained within the reservoir 58 is a grease-based valve sealant but could be any other type of fluid, either gas or liquid, that can communicate a pressure from one area to another. A pressure outlet line 60 leads from the outlet port 46 to an inlet port 62 formed in the inner flange 34 of the pressure sealing device 10.

As illustrated in FIG. 2, the pressure of the fluid within the outlet line 60 is created by a combination of the pressure of the fluid in the inlet line 62, which corresponds to the pressure of the fluid within the open interior 50, and the bias force created by the charging spring 54. In this manner, the pressurizing system 42 of the present disclosure insures that the pressure of the fluid contained within the pressurized outlet line 60 is greater than the pressure of the fluid in the open interior 50 of the piping system 24 and thus in the inlet line 64. In the embodiment shown in FIG. 2, a valve 66 is positioned to allow air to be bled off from the reservoir 58. Further, the valve 66 also functions as a fill valve that allows the fluid contained within the reservoir 58 to be filled and replenished as needed.

Figure 3:
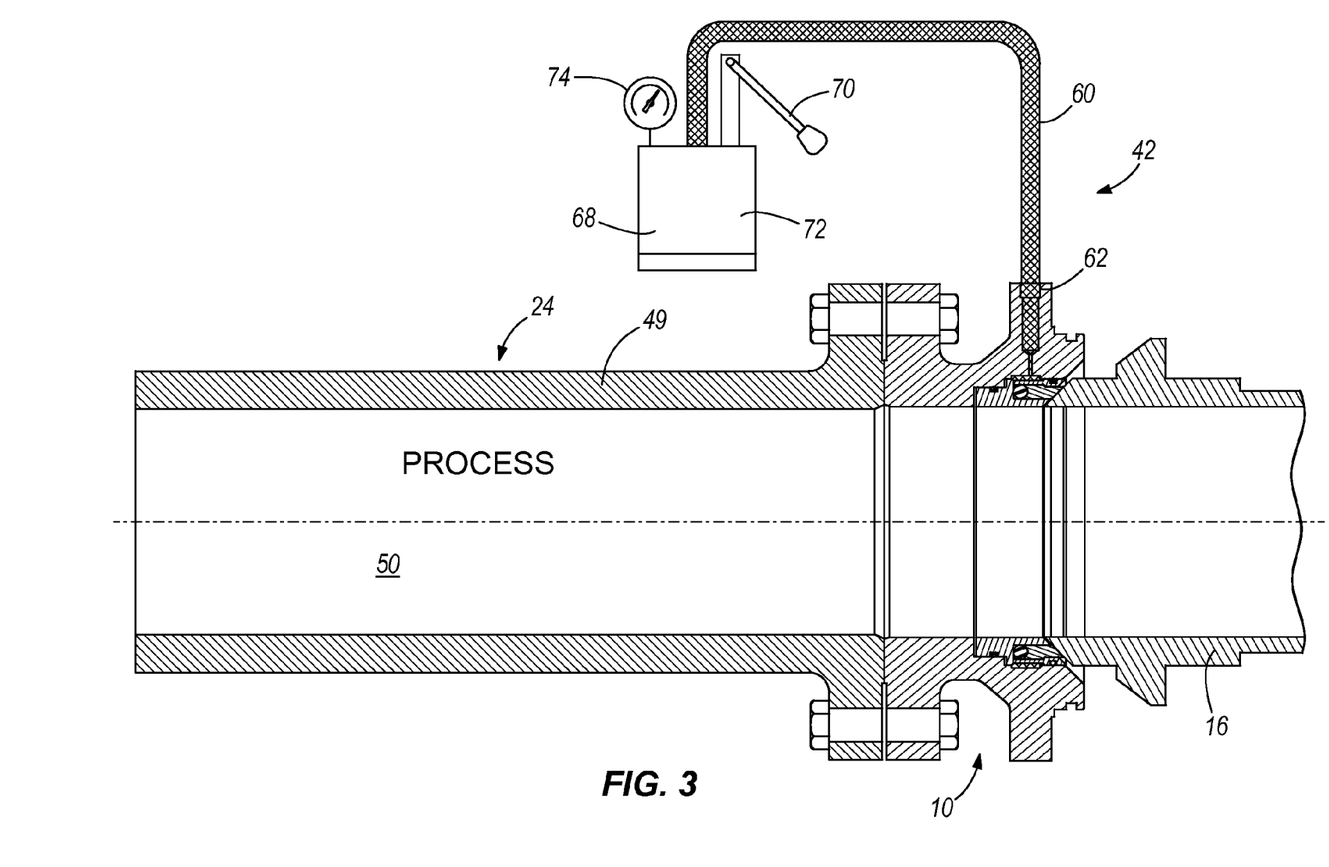
FIG. 3 is a second embodiment of the pressurizing system used to charge the sealing system of the present disclosure.

FIG. 3 illustrates a second embodiment of the pressurizing system 42 that is utilized to create the required fluid pressure within the pressurized outlet line 60. In the embodiment shown in FIG. 3, the pressurizing device includes a jack pump 68 that includes a handle 70. The handle 70 can be manually moved to create pressure on the hydraulic fluid or sealant contained within the open reservoir 72. The jack pump 68 includes a pressure gauge 74 that allows an operator to determine the amount of pressure created within the open reservoir 72. The alternate embodiment of the pressurizing system shown in FIG. 3 creates the desired amount of fluid pressure within the pressurized outlet line 60, which in turn leads to the inlet port 62 formed as part of the pressure sealing device 10.

The pressurizing system 42 shown in FIG. 3 can be modified to include a pulsation damper in the outlet line 60 between the jack pump and the inlet port 62. Pulsation dampers are well-known components that include a bladder that is pre-charged by a supply of gas, such as nitrogen. The pulsation damper can be installed at the discharge side of the jack pump to reduce noise and vibration and create a more constant pressure on the sealing ring.

Figure 4:
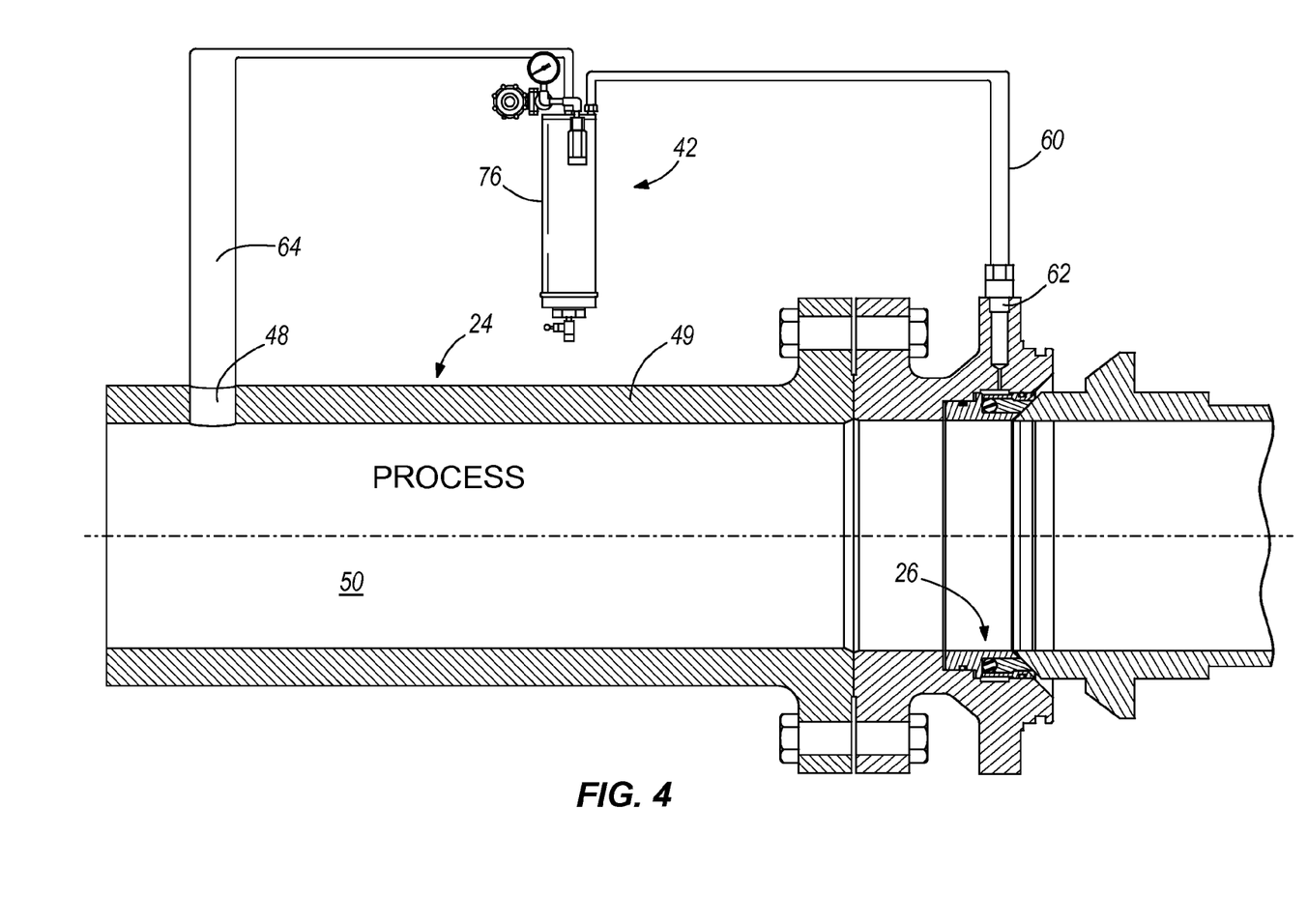
FIG. 4 is yet another alternate configuration of the pressure system used to power the seating assembly.

FIG. 4 illustrates yet another alternate embodiment of the pressurizing system 42. In the embodiment shown in FIG. 4, the pressurizing system 42 includes an inlet line 64 that receives the fluid flowing within the open interior 50 of the piping system 24. The fluid flows through the pressure sensing port 48 and into a combination filter and dryer 76. The filter and dryer cleans and dries the fluid flowing through the piping system 24 such that after being filtered, the fluid from within the piping system flows into a pressurized outlet line 60. Since the pressurizing system 42 draws a portion of the fluid from the open interior 50 and uses the pressure of this fluid to drive the sliding seating mechanism 26, the sliding seating mechanism 26 is designed to include a wave spring or coil spring to increase the pressure acting on the sliding seating mechanism 26 above the pressure of the fluid within the piping system 24. Details of the use of a wave spring or coil spring to increase the pressure on the seat ring will be described in greater detail below with reference to FIG. 6.

Figure 5:
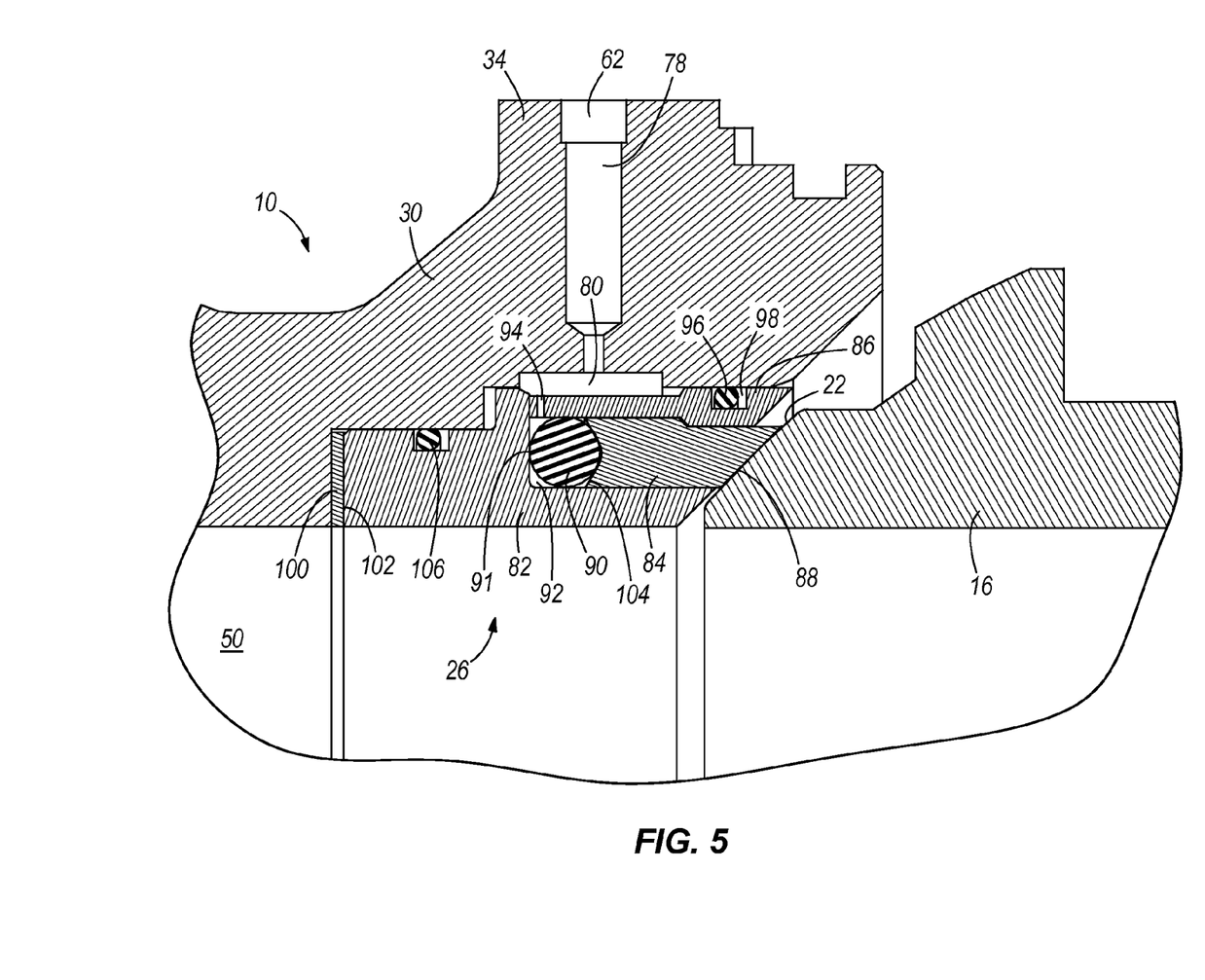
FIG. 5 is a magnified, section view of a first embodiment of the seating mechanism.

FIG. 5 illustrates the detailed configuration of one embodiment of the sliding seating mechanism 26 constructed in accordance with the disclosure. The sliding seating mechanism 26 is formed as part of the pressure seating device 10 and creates a seal against the seating surface 22 of the ball 16. As described previously, the inner flange 34 includes an inlet port 62 that leads into a fluid passageway 78. The fluid passageway 78 extends through the solid body 30 of the inner flange 34 and extends into fluid communication with an annular seating member charging chamber 80. In this manner, the annular charging chamber 80 receives the supply of pressurized fluid from the pressurizing system shown in one of the embodiments of FIGS. 2-4.

The sliding seating mechanism 26 includes a stationary inner ring 82, a dynamic center sealing ring 84 and a stationary outer ring 86. In the embodiment illustrated, the center sealing ring 84 is movable relative to the stationary inner ring 82 and the stationary outer ring 86. The center sealing ring 84 includes an outer sealing surface 88 that is urged into contact with the seating surface 22 of the ball 16. In the embodiment illustrated in FIG. 5, a resilient O-ring 90 is compressed between a shoulder 91 formed in the inner ring 82 and a rear surface 104 of the center sealing ring 84 such that the resilient properties of the O-ring 90 creates a bias force that urges the sealing surface 88 of the center sealing ring 84 into contact with the seating surface 22 of the ball 16.

When a supply of pressurized fluid is received within the annular charging chamber 80, the supply of pressurized fluid is communicated to an open cavity 92 that includes the O-ring 90 through a pressure port 94 formed in the outer ring 86. The pressure of the fluid flowing into the open cavity 92 creates a sealing force that combines with the bias force to urge the center sealing ring 84 outward and toward the seating surface 22 of the ball 16.

A sealing member 96, such as an O-ring, is positioned within an open cavity 98 to create a fluid-tight seal to prevent the sealant from passing out of the annular charging chamber 80. A second sealing member 106 prevents the flow of the fluid in the charging chamber 80 from flowing past the inner ring 82. A sealing gasket 100 is positioned between a back surface 102 of the inner ring 82 to prevent the flow of the fluid contained within the open interior 50 of the piping system from reaching the annular charging chamber 80. As can be understood in FIG. 5, the pressurized fluid received at the inlet port 62 exerts a force on the rear surface 104 of the center ring 84 to increase the pressure between the sealing surface 88 and the seating surface 22 of the ball 16. The pressure of the sealant creates an additional force on the center sealing ring 84 in addition to the bias force created by the O-ring 90.

Figure 6:
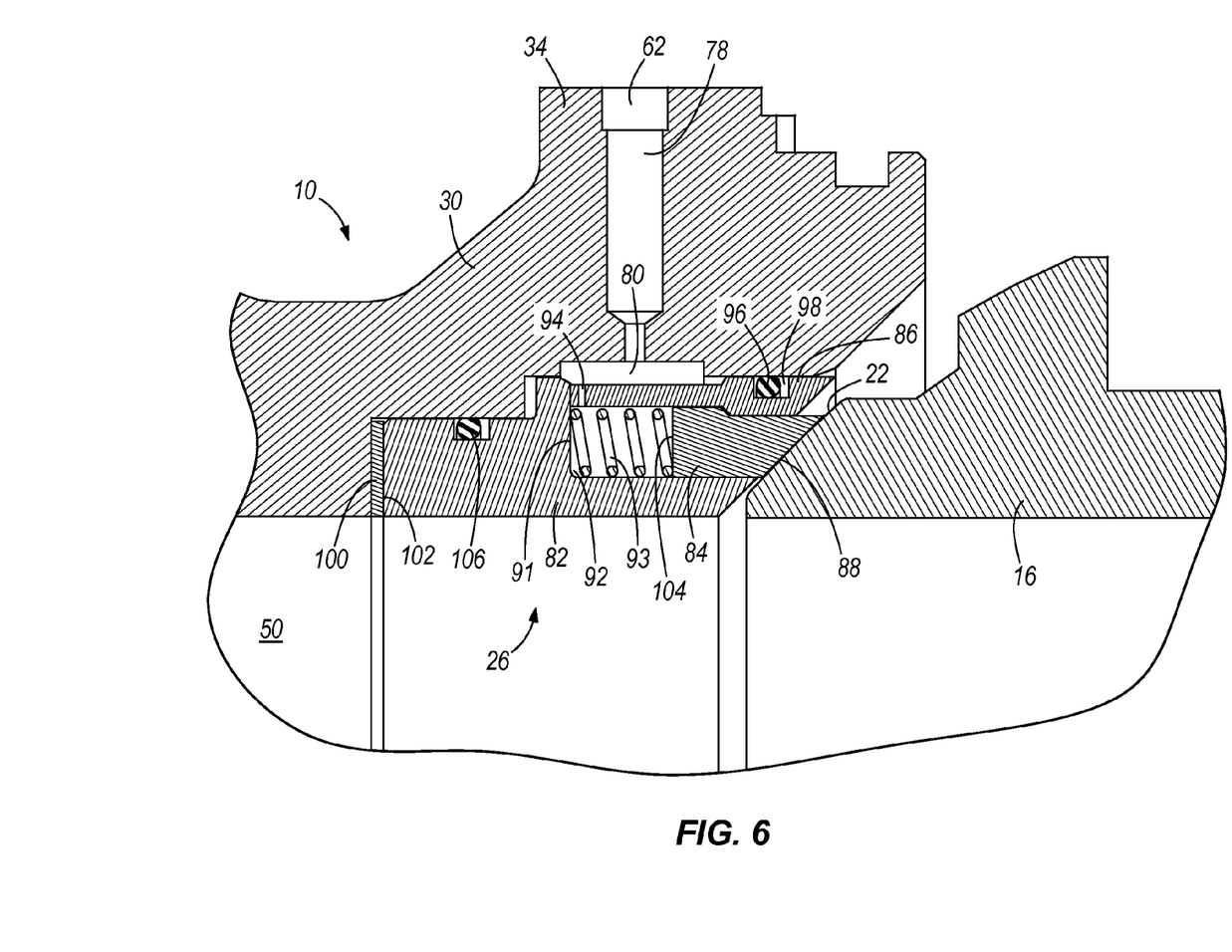
FIG. 6 is a magnified, section view of a second embodiment of the seating mechanism.

In an alternate, contemplated embodiment shown in FIG. 6, the O-ring 90 can be replaced by a wave spring or a coil spring 93. The use of a wave spring or a coil spring 93 provides another mechanism to create a bias force against the rear surface 104. As can be understood in FIGS. 5 and 6, the force urging the center sealing ring 84 into contact with the ball 16 is created by a combination of the sealing force created by the pressurized fluid entering through the inlet port 62 and the bias force created by the bias member, such as the O-ring 90 or the bias spring 93. The combination of the two forces is exerted against the rear surface 104.

In the embodiments shown in FIGS. 5 and 6, the gasket 100 and the sealing member 106 are used to prevent the flow of both the pressurized fluid received at the inlet port 62 and the pressurized liquid in the piping system from flowing past the inner ring 82. In a contemplated embodiment, the entire inner ring 82 can be welded to the main body 30, thus eliminating the need for the sealing member 106 and the gasket 100.

Figure 7:
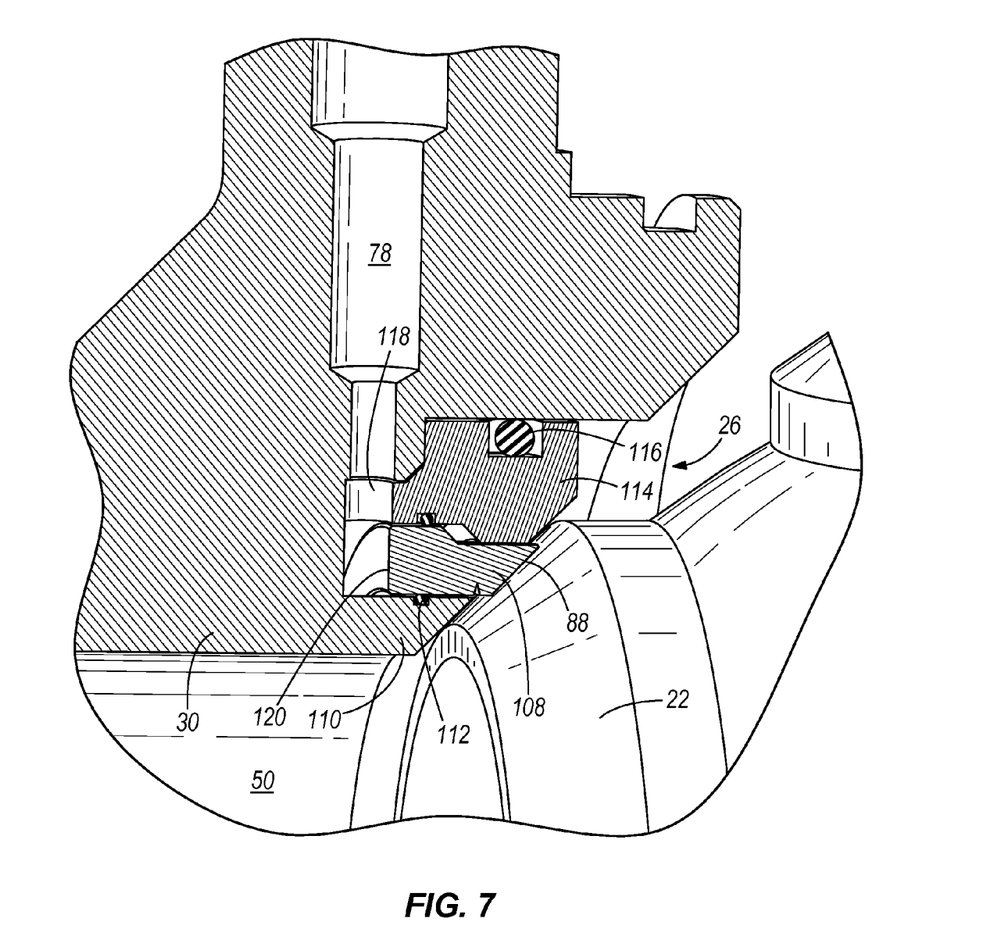
FIG. 7 is a third embodiment of the sliding seating mechanism.

FIG. 7 illustrates an alternate embodiment of the sliding seating mechanism 26. In the embodiment shown in FIG. 7, the sliding seating mechanism 26 includes the moving center sealing ring 108 having the sealing surface 88. However, in the embodiment shown in FIG. 7, the inner ring is eliminated and instead a lower flange 110 formed as part of the main body 30 is positioned below the moving center ring 108. The lower flange 110 includes a sealing member 112. Outer ring 114 includes a sealing O-ring 116 and a rear pressure port 118 that allows fluid to flow from the fluid passageway 78 into contact with rear surface 120 of the center ring 108. Although not shown, an O-ring or spring could be placed in contact with the rear surface 120 to increase the bias force generated between the sealing surface 88 of the center ring 108 and the sealing surface 22 of the ball.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A differential pressure sealing device for use with ball valves having a moving ball with at least one seating surface, the sealing device comprising:
    a seating mechanism including a movable sealing ring positioned between a stationary inner ring and a stationary outer ring, the movable sealing ring having a moveable sealing surface that interacts with the at least one seating surface of the ball;
    a pressurizing system having an outlet port that communicates a supply of pressurized fluid through the stationary outer ring to an open cavity between the movable sealing ring and the stationary inner ring to exert a sealing force on the movable sealing ring to urge the sealing surface of the sealing ring against the at least one seating surface of the moving ball; and
    a bias member positioned between the stationary inner ring and the movable sealing ring to exert a bias force on a rear surface of the sealing ring opposite the sealing surface, wherein the bias member is a spring compressed between the rear surface and a stationary shoulder formed on the stationary inner ring, wherein the bias force is combined with the sealing force created by the pressurized fluid.

2. The sealing device of claim 1 wherein the pressurized fluid is a non-compressible valve sealant.

3. A differential pressure sealing device for use with a piping system containing a flow of fluid passing there through at a first pressure, the sealing device comprising:
    a seating mechanism;
    a reservoir including a supply of fluid having a fixed volume;
    a pressurizing system having a device for compressing the supply of fluid above the first pressure and having an outlet port to supply the pressurized supply of fluid to the seating mechanism at a sealing pressure greater than the first pressure to urge the seating mechanism into a sealing position,
    wherein the device for compressing the fluid includes a movable piston and a charging spring, wherein the charging spring exerts a charging force on the piston to pressurize the fluid in the reservoir, wherein the charging spring is held in a compressed position and is further compressed by the pressure of the fluid flowing through the piping system.

4. The sealing device of claim 3 wherein the device for compressing the fluid is a pump.

5. The sealing device of claim 3 wherein the device for compressing the fluid includes a filter having an inlet to receive the fluid flowing through the piping system and an outlet to supply the filtered fluid to the seating mechanism.

* * * * *